United States Patent
Gupta et al.

(10) Patent No.: US 11,727,700 B2
(45) Date of Patent: Aug. 15, 2023

(54) LINE REMOVAL FROM AN IMAGE

(71) Applicant: Capital One Services, LLC, McLean, VA (US)

(72) Inventors: Saumya Gupta, Bangalore (IN); Arpit Dubey, Bhopal (IN)

(73) Assignee: Capital One Services, LLC, McLean, VA (US)

( * ) Notice: Subject to any disclaimer, the term of this patent is extended or adjusted under 35 U.S.C. 154(b) by 120 days.

(21) Appl. No.: 17/345,541

(22) Filed: Jun. 11, 2021

(65) Prior Publication Data

US 2022/0398398 A1    Dec. 15, 2022

(51) Int. Cl.
*G06V 30/10*      (2022.01)
*G06V 30/148*     (2022.01)
*G06T 7/60*       (2017.01)
*G06V 30/414*     (2022.01)

(52) U.S. Cl.
CPC .............. *G06V 30/155* (2022.01); *G06T 7/60* (2013.01); *G06V 30/414* (2022.01)

(58) Field of Classification Search
CPC ......... G06V 30/414; G06V 30/10; G06T 7/60
See application file for complete search history.

(56) References Cited

U.S. PATENT DOCUMENTS

| | | |
|---|---|---|
| 4,747,156 A | 5/1988 | Wahl |
| 6,873,728 B2 | 3/2005 | Bernstein et al. |
| 9,495,343 B2 | 11/2016 | Fang |
| 2019/0095743 A1* | 3/2019 | Li ........................ G06V 30/15 |

* cited by examiner

*Primary Examiner* — Qian Yang
(74) *Attorney, Agent, or Firm* — Harrity & Harrity, LLP

(57) ABSTRACT

In some implementations, a device may process an image to identify one or more first lines of the image that extend in a first dimension. The device may process the image to identify one or more second lines of the image that extend in a second dimension orthogonal to the first dimension. The device may identify portions of the one or more first lines that do not intersect with the one or more second lines. The device may process the image to obtain a version of the image in which the portions of the one or more first lines are removed.

20 Claims, 8 Drawing Sheets

US 11,727,700 B2

LINE REMOVAL FROM AN IMAGE

BACKGROUND

Optical character recognition (OCR) techniques are often used in computing environments to identify text within an image and extract the text in a manner designed to enable the identified text to be read by a human and/or handled by a computer. For example, digital documents may often be stored on a computer as an image, rather than machine-encoded text. OCR can identify text included in digital documents so that they can be electronically processed.

SUMMARY

In some implementations, a system for line removal from an image includes one or more memories and one or more processors, communicatively coupled to the one or more memories, configured to: process the image using a first bounding box to identify one or more first lines of the image that extend in a first dimension, wherein the first bounding box is elongated in the first dimension; generate, based on processing the image using the first bounding box, first information that identifies the one or more first lines; process the image using a second bounding box to identify one or more second lines of the image that extend in a second dimension orthogonal to the first dimension, wherein the second bounding box is elongated in the second dimension; generate, based on processing the image using the second bounding box, second information that identifies the one or more second lines; generate, based on the first information and the second information, third information that identifies portions of the one or more first lines that do not intersect with the one or more second lines; process the image, based on the third information, to obtain a version of the image in which the portions of the one or more first lines are removed; and perform optical character recognition on the version of the image in which the portions of the one or more first lines are removed.

In some implementations, a method for line removal from an image includes processing, by a device, the image to identify one or more first lines of the image that extend in a first dimension; processing, by the device, the image to identify one or more second lines of the image that extend in a second dimension orthogonal to the first dimension; identifying, by the device, portions of the one or more first lines that do not intersect with the one or more second lines; and processing, by the device, the image to obtain a version of the image in which the portions of the one or more first lines are removed.

In some implementations, a non-transitory computer-readable medium storing a set of instructions for line removal from an image includes one or more instructions that, when executed by one or more processors of a device, cause the device to: process the image using a first kernel to identify one or more first lines of the image; generate, based on processing the image using the first kernel, first information that identifies the one or more first lines; process the image using a second kernel to identify one or more second lines of the image orthogonal to the one or more first lines; generate, based on processing the image using the second kernel, second information that identifies the one or more second lines; generate, based on the first information and the second information, third information that identifies portions of the one or more first lines that do not intersect with the one or more second lines; and process the image, based on the third information, to obtain a version of the image in which the portions of the one or more first lines are removed.

DETAILED DESCRIPTION

Figure 1A:
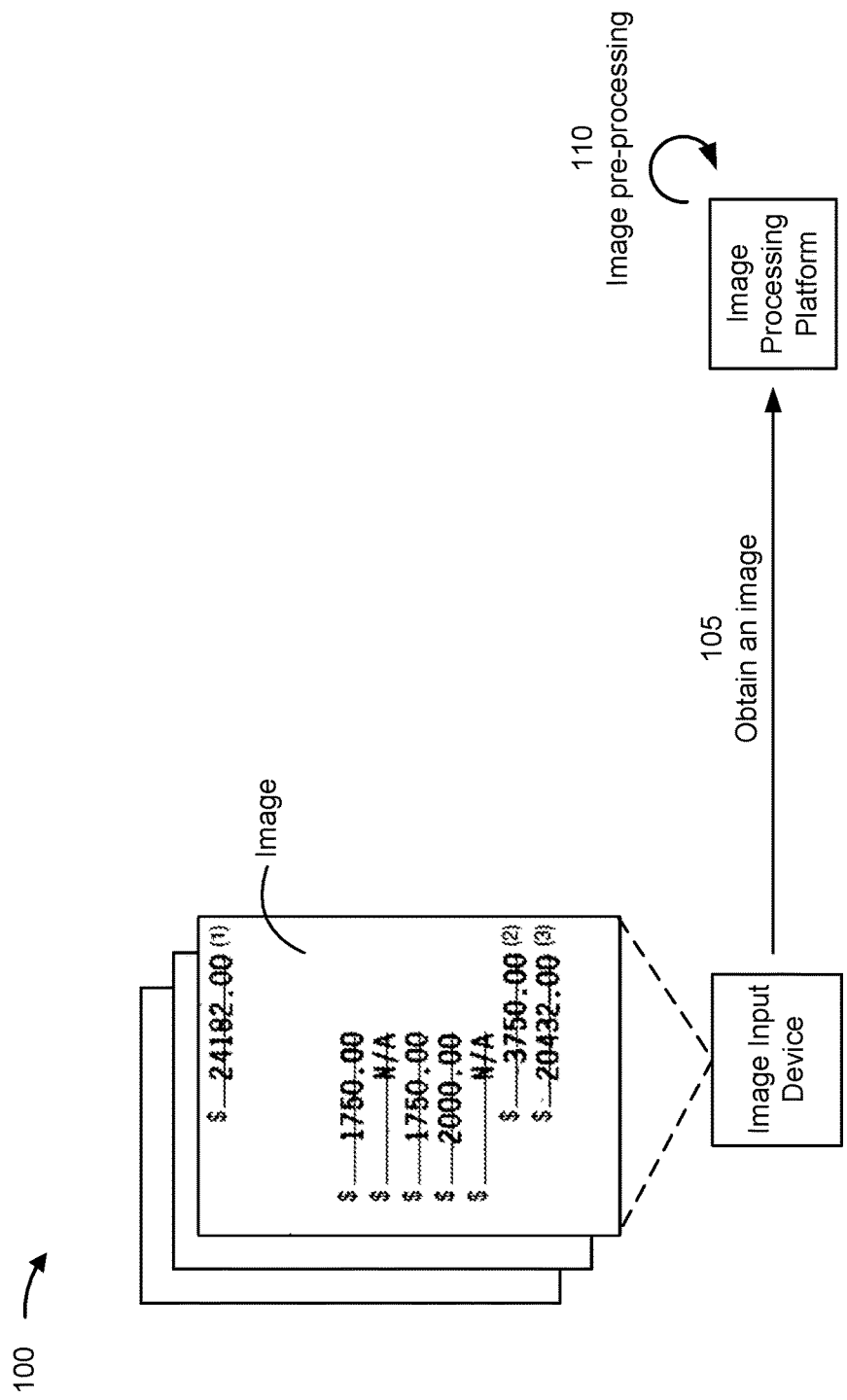
FIGS. 1A-1E are diagrams of an example implementation relating to line removal from an image.

The following detailed description of example implementations refers to the accompanying drawings. The same reference numbers in different drawings may identify the same or similar elements.

As described above, optical character recognition (OCR) is used to identify text within a digital image. Often, before OCR is performed on an image, the image may undergo various forms of pre-processing (for example, to remove noise from the image, to correct a skew of the image, or the like). One example of image pre-processing is line (or box) removal from an image (which may be considered a form of noise removal). In some cases, lines in an image may overlap with text in the image (for example, due to printing misalignment, underlining of text, strikethrough of text, or the like). Accordingly, removal of lines from an image that contains text may facilitate OCR performed on the image.

Typically, line removal from an image may involve identifying a line (e.g., consecutive black pixels) in the image, and processing the image to remove the entire line from the image. However, when the line is overlapping with text, removal of the line (e.g., by assigning pixels associated with the line to a white pixel value) may also remove portions of the text. Thus, line removal from the image may distort the text and/or remove identifiable features from the text, which may decrease an accuracy of OCR performed on the image (e.g., OCR performed on an image processed with such a line removal technique may have an accuracy of about 70%). As a result, additional OCR processing of the image may need to be performed (e.g., using one or more different OCR techniques) and/or the image may need to be loaded and displayed for manual review, thereby consuming additional computing resources.

A solution to the above technical problem is described herein for removing lines from an image that contains text while minimizing disturbance to text in the image. In some implementations, an image processing platform may process an image to identify first lines in the image that extend in a first dimension (e.g., horizontally). For example, the first lines may be lines that are to be removed from the image. The image processing platform may further process the image to identify second lines in the image that extend in a second dimension (e.g., vertically). For example, the second lines may be vertical portions of text (e.g., a stem portion of the letter T or the letter F). The image processing platform may identify portions of the first lines that do not intersect with the second lines, which may represent portions of the first lines that do not overlap with text. Accordingly, the image processing platform may process the image to remove the (non-intersecting) portions of the first lines (e.g., rather than removing the entirety of the first lines), and the image processing platform may perform OCR on the resulting processed image.

In this way, the image processing platform may perform line removal from a digital image while minimizing disturbance to text in the image. Accordingly, the image processing platform may generate images for OCR with text that is less distorted and more easily identifiable. Thus, OCR performed on the image may achieve improved accuracy (e.g., an accuracy of about 90%), thereby conserving computing resources that may otherwise be used for additional OCR processing of the image and/or manual review of the image.

FIGS. 1A-1E are diagrams of an example implementation 100 associated with line removal from an image. As shown in FIGS. 1A-1E, example implementation 100 includes an image processing platform (e.g., which may be implemented by one or more server devices) and an image input device. These devices are described in more detail below in connection with FIG. 2 and FIG. 3. In some implementations, the image processing platform may be associated with an organization, such as a financial institution, that receives numerous documents associated with providing services of the organization (e.g., financial services, such as loans, mortgages, or the like). For example, a financial institution may need to perform OCR on thousands, millions, billions or more documents in order to extract text from the documents for record keeping or for further use or processing.

As shown in FIG. 1A, and by reference number 105, the image processing platform may obtain an image (e.g., on which OCR is to be performed). For example, the image processing platform may obtain the image from the image input device. The image processing platform may obtain a single image at a time for processing, or the image processing platform may obtain multiple images at a time for batch processing. The image processing platform may obtain the image based on a user command, based on a triggering event, in an on-demand manner, or the like. In some implementations, the image processing platform may obtain the image from a local storage of the image processing platform.

The image may include text (e.g., textual characters). Moreover, the image may include noise, such as one or more horizontal lines, one or more vertical lines, or the like, which in some cases may overlap with the text. In addition, the image may include one or more graphical elements, such as a logo. Typically, the image that includes text has a white (or near white) background and black (or near black) text, and the description that follows is described in terms of such an image. However, the description herein may apply equally to an image that has another color arrangement, such as an image that has a black background and white text, an image that has an orange background and blue text, and so forth.

The image may be two-dimensional, and therefore have a first dimension and a second dimension. The first dimension and the second dimension may be orthogonal. For horizontal line removal, in accordance with the description herein, the first dimension may be a horizontal dimension (e.g., an x-dimension), and the second dimension may be a vertical dimension (e.g., a y-dimension), relative to an orientation of text in the image. For vertical line removal, in accordance with the description herein, the first dimension may be a vertical dimension (e.g., a y-dimension), and the second dimension may be a horizontal dimension (e.g., an x-dimension), relative to an orientation of text in the image.

As shown by reference number 110, the image processing platform may perform pre-processing of the image (e.g., processing of the image that occurs before an OCR operation). Pre-processing may include one or more image processing operations designed to make textual content of the image easier to read using OCR. For example, pre-processing may include contrast adjustment, brightness adjustment, noise filtering or reduction, histogram modification, skew correction, and/or cropping, among other examples. In some implementations, pre-processing may include reducing colors of the image, for example, by converting the image to grayscale.

In some implementations, the image processing platform may perform pre-processing of the image to determine information about contents of the image. In some examples, the image processing platform may process the image to identify a background color (or multiple similar background colors) of the image (e.g., white) and to identify a foreground color (or multiple similar foreground colors) of the image (e.g., black/gray). In some examples, the image processing platform may process the image to identify a size (e.g., an average size, a standard character size, or the like) of textual characters in the image. For example, the image processing platform may perform a horizontal smudge operation on the image to obtain a resultant image with horizontal bars alternating in color (e.g., alternating white and black/gray bars), and the image processing platform may determine a height of one or more of the horizontal bars (e.g., the black/gray bars) to identify the size (e.g., the height that is determined may also imply a width) of the text characters. Other techniques for identifying character size may be additionally or alternatively used. Moreover, the image processing platform may process the image to identify a font of the textual characters and/or a stroke thickness of the textual characters (e.g., which may be determined based on the size of the textual characters). In some implementations, the image processing platform may use one or more artificial intelligence techniques, such as a machine learning technique, a neural network technique, a computer vision technique, or the like, to determine any of the aforementioned information about the contents of the image.

In some implementations, the image processing platform may identify a document type associated with the image (e.g., a loan application, an identification card, a personal check, or the like). For example, the image processing platform may use one or more artificial intelligence techniques, as described above, to identify the document type associated with the image. Based on the document type, the image processing platform may infer the information about contents of the image. For example, the image processing platform may determine that the document type is associated with (e.g., according to information stored by the image processing platform, according to an output of a machine learning model, or the like) one or more particular background colors, one or more particular foreground colors, one or more particular textual character sizes, one or more particular textual character fonts, one or more particular textual character stroke thicknesses, etc.

The image processing platform may determine parameters for performing line removal from the image based on the information about the contents of the image. For example, the image processing platform may determine a pixel value, or a range of pixel values, that is to be regarded as a background color of the image (e.g., based on identifying the background color). As another example, the image processing platform may determine a pixel value, or a range of pixel values, that is to be regarded as a foreground color (e.g., associated with text or noise) of the image (e.g., based on identifying the foreground color).

In some implementations, the image processing platform may determine one or more pixel quantity thresholds used for identifying lines in the image based on the size of the textual characters, the font of the textual characters, and/or the stroke thickness of the textual characters (e.g., as a function of the size, the font, and/or the stroke thickness). For example, the image processing platform may determine a first threshold quantity of pixels, consecutive in the first dimension (e.g., one of horizontal or vertical), for identifying lines that extend in the first dimension, and a second threshold quantity of pixels, consecutive in the second dimension (e.g., orthogonal to the first dimension), for identifying lines that extend in the second dimension, based on the size of the textual characters. As an example, a line in the first dimension may be identified if a quantity of consecutive pixels in the first dimension meets or exceeds the first threshold quantity of pixels, and a line in the second dimension may be identified if a quantity of consecutive pixels in the second dimension meets or exceeds the second threshold quantity of pixels. The first threshold quantity of pixels may be greater than the second threshold quantity of pixels.

In an example of horizontal line removal, the first threshold quantity of pixels may be a quantity of horizontally consecutive pixels (e.g., in an x-dimension) for identifying horizontal lines, and the second threshold quantity of pixels may be a quantity of vertically consecutive pixels (e.g., in a y-dimension) for identifying vertical lines. Continuing with the example, the first threshold quantity of pixels for identifying horizontal lines may be greater than the second threshold quantity of pixels for identifying vertical lines. For example, the first threshold quantity of pixels may be at least a quantity of pixels that corresponds to a width of at least two textual characters. Moreover, the first threshold quantity of pixels may be at most a quantity of pixels that corresponds to an expected length (e.g., a desired length, a configured length, or the like) of lines that are to be removed. As another example, the second threshold quantity of pixels may be at most (or less than) a height of one textual character. Moreover, the second threshold quantity of pixels may be at least a stroke thickness of the textual characters.

In some implementations, the aforementioned parameters for performing line removal may be configured (e.g., by an operator of the image processing platform), may be default values, or may be based on historical data.

Figure 1B:
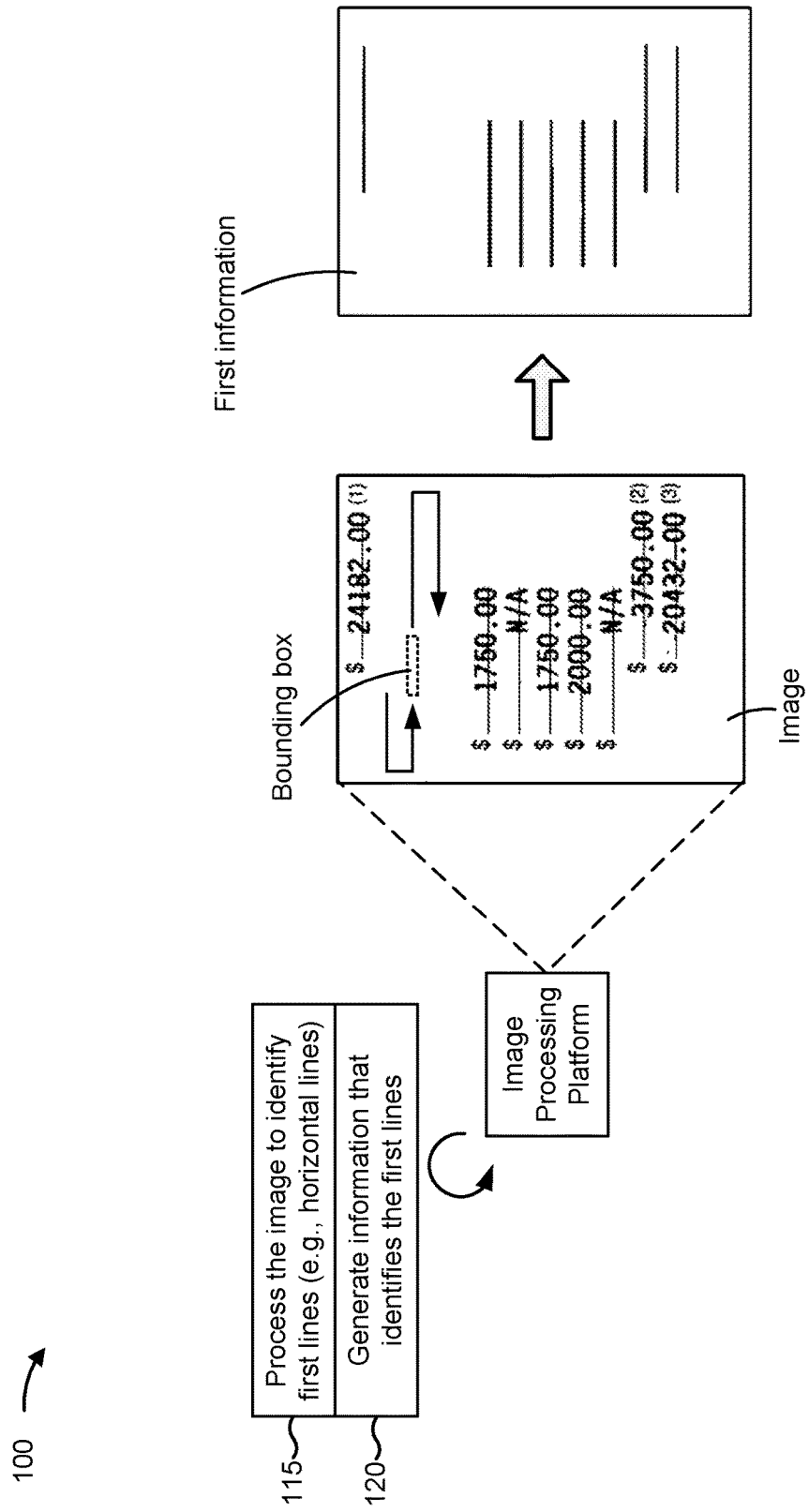

As shown in FIG. 1B, and by reference number 115, the image processing platform may process the image (e.g., image data of the image) to identify one or more first lines of the image that extend in the first dimension. For example, the first lines may be horizontal lines (e.g., relative to an orientation of text in the image). Here, a portion of a line, of the first lines, may overlap with text in the image.

The image processing platform may process the image to identify the first lines using a first bounding box. The first bounding box may be elongated in the first dimension (e.g., a length of the first bounding box in the first dimension may be greater than a length of the first bounding box in the second dimension). For example, the first bounding box may be a horizontal bounding box (e.g., elongated horizontally) for identification of horizontal lines. As an example, the first bounding box may be greater than 1 pixel (e.g., 50 pixels) horizontally and 1 pixel vertically. A size of the first bounding box in the first dimension (e.g., horizontally) may correspond to the first threshold quantity of pixels. In some examples, a size of the first bounding box in the second dimension (e.g., vertically) may correspond to a threshold line thickness for line identification.

In some implementations, the first bounding box may be a first kernel (which may also be referred to as a convolution matrix or a mask). The first kernel may be larger in the first dimension (e.g., a quantity of elements of the first kernel in the first dimension may be greater than a quantity of elements of the first kernel in the second dimension). For example, the first kernel may be a horizontal kernel (e.g., larger horizontally) for identification of horizontal lines. As an example, the first kernel (e.g., a matrix) may include a greater quantity of columns than rows.

The image processing platform, using the first bounding box (e.g., the first kernel) to process the image (e.g., image data of the image), may scan the image along the first dimension in increments corresponding to the first bounding box. In an example of horizontal line removal, the image processing platform may horizontally scan each row of the image in increments of the first bounding box (e.g., moving across the row pixel-by-pixel). The image processing platform may identify the first lines based on processing the image using the first bounding box. For example, the image processing platform may identify a line, of the first lines, based on a determination that the first bounding box encompasses a plurality of pixels, consecutive in the first dimension, that are associated with one or more particular pixel values (e.g., associated with the foreground color(s) identified for the image), and a quantity of the plurality of pixels satisfies the first threshold quantity of pixels (e.g., the line can be identified when the first bounding box is filled with pixels associated with the particular pixel value(s)). As an example, the image processing platform may identify a horizontal line based on a determination that the first bounding box encompasses a plurality of horizontally consecutive pixels that are associated with one or more pixel values identified for the foreground color(s) (e.g., a pixel value corresponding to black or within a threshold value of the pixel value), and a quantity of the plurality of horizontally consecutive pixels satisfies the first threshold quantity of pixels (e.g., the line can be identified when the first bounding box is filled with pixels associated with the pixel value(s) identified for the foreground color(s)).

As shown by reference number 120, the image processing platform may generate first information (e.g., image data) that identifies (e.g., as pixels) the first lines. The image processing platform may generate the first information based on processing the image using the first bounding box (e.g., the first kernel). The first information may identify the first lines in isolation from a remaining portion of the image (e.g., the first information identifies only the first lines). In some implementations, the first information generated by the image processing platform may include a matrix of image data representative of the first lines (e.g., of only the first lines). Additionally, or alternatively, the first information generated by the image processing platform may include a new image that includes the first lines (e.g., includes only the first lines).

Figure 1C:
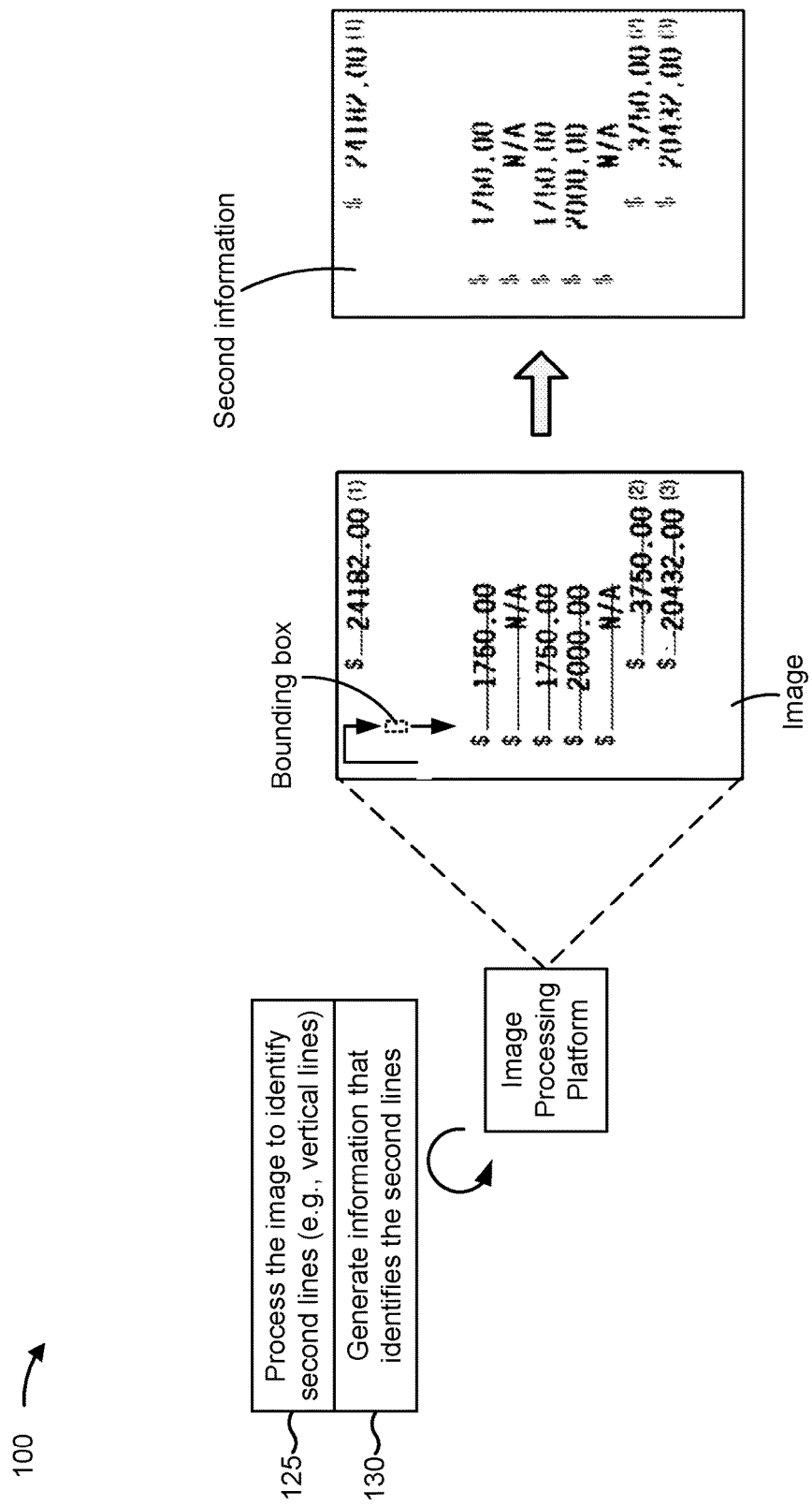

As shown in FIG. 1C, and by reference number 125, the image processing platform may process the image (e.g., image data of the image) to identify one or more second lines of the image that extend in the second dimension (e.g., orthogonal to the first lines that extend in the first dimension). For example, the second lines may be vertical lines (e.g., relative to an orientation of text in the image). Here, a line, of the second lines, may be a portion (e.g., a vertical portion) of text in the image.

The image processing platform may process the image to identify the second lines using a second bounding box, in a similar manner as described above. The second bounding box may be elongated in the second dimension. For example, the second bounding box may be a vertical bounding box (e.g., elongated vertically) for identification of vertical lines. As an example, the second bounding box may be 1 pixel horizontally and greater than 1 pixel (e.g., 5 pixels) vertically. A size of the second bounding box in the second dimension (e.g., vertically) may correspond to the second threshold quantity of pixels. In some examples, a size of the second bounding box in the first dimension (e.g., horizontally) may correspond to a threshold line thickness for line identification.

In some implementations, the second bounding box may be a second kernel, in a similar manner as described above. The second kernel may be larger in the second dimension. For example, the second kernel may be a vertical kernel (e.g., larger vertically) for identification of vertical lines. As an example, the second kernel (e.g., a matrix) may include a greater quantity of rows than columns.

In some implementations, the first bounding box (e.g., the first kernel) may be configured for identification of lines of a first length, and the second bounding box (e.g., the second kernel) may be configured for identification of lines of a second length. The first length may be greater than the second length. In other words, a size of the first bounding box in the first dimension may be greater (e.g., 5 times greater, 10 times greater, or the like) than a size of the second bounding box in the second dimension. In this way, the first bounding box may be used to identify longer horizontal lines, such as lines that overlap text, and the second bounding box may be used to identify shorter vertical lines such as lines that form vertical portions of a textual character.

The image processing platform, using the second bounding box (e.g., the second kernel) to process the image (e.g., image data of the image), may scan the image along the second dimension in increments corresponding to the second bounding box. In an example of horizontal line removal, the image processing platform may vertically scan each column of the image in increments of the second bounding box (e.g., moving along the column pixel-by-pixel). The image processing platform may identify the second lines based on processing the image using the second bounding box. For example, the image processing platform may identify a line, of the second lines, based on a determination that the second bounding box encompasses a plurality of pixels, consecutive in the second dimension, that are associated with one or more particular pixel values (e.g., associated with the foreground color(s) identified for the image), and that a quantity of the plurality of pixels satisfies the second threshold quantity of pixels (e.g., the line can be identified when the second bounding box is filled with pixels associated with the particular pixel value(s)). As an example, the image processing platform may identify a vertical line based on a determination that the second bounding box encompasses a plurality of vertically consecutive pixels that are associated with one or more pixel values identified for the foreground color(s) (e.g., a pixel value corresponding to black or within a threshold value of the pixel value), and a quantity of the plurality of vertically consecutive pixels satisfies the second threshold quantity of pixels (e.g., the line can be identified when the second bounding box is filled with pixels associated with the pixel value(s) identified for the foreground color(s)).

As shown by reference number 130, the image processing platform may generate second information (e.g., image data) that identifies (e.g., as pixels) the second lines. The image processing platform may generate the second information based on processing the image using the second bounding box (e.g., the second kernel). The second information may identify the second lines in isolation from a remaining portion of the image (e.g., the second information identifies only the second lines). In some implementations, the second information generated by the image processing platform may include a matrix of image data representative of the second lines (e.g., of only the second lines). Additionally, or alternatively, the second information generated by the image processing platform may include a new image that includes the second lines (e.g., that includes only the second lines).

Figure 1D:
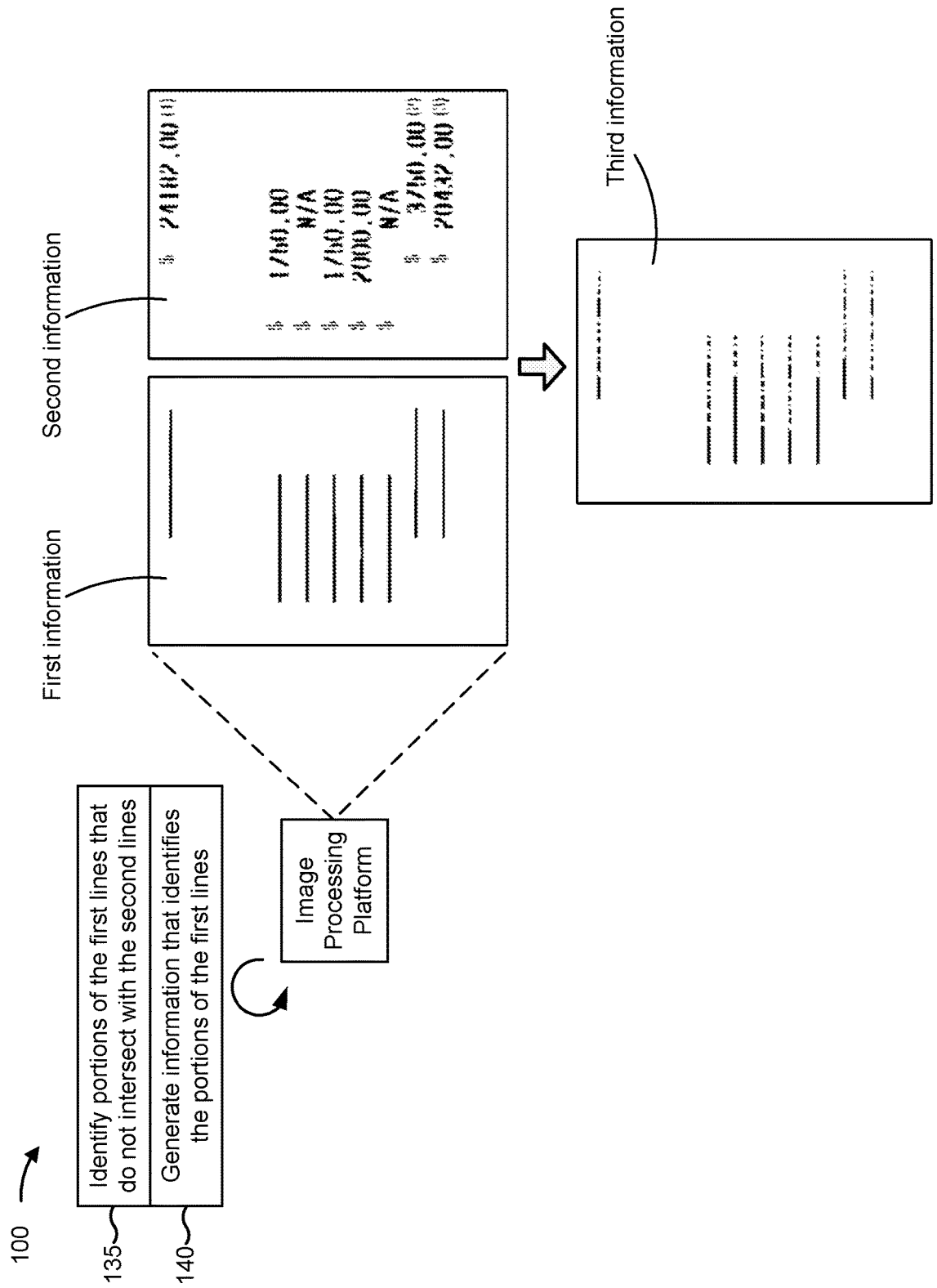

As shown in FIG. 1D, and by reference number 135, the image processing platform may identify portions of the first lines that do not intersect with (e.g., do not overlap) the second lines. For example, the image processing platform may identify the portions of the first lines based on the first information and the second information generated by the image processing platform. As an example, the image processing platform may determine (e.g., compute) a difference of the first information and the second information (e.g., subtract the second information from the first information). In this way, the image processing platform may identify portions of the first lines that likely do not overlap text of the image, and accordingly discard the other portions of the first lines that likely overlap with the text.

As shown by reference number 140, the image processing platform may generate third information (e.g., image data) that identifies (e.g., as pixels) the portions of the first lines that do not intersect with the second lines. The third information may identify the portions of the first lines in isolation from a remaining portion of the image (e.g., the third information identifies only the portions of the first lines). The image processing platform may generate the third information by removing a pixel (e.g., assigning to the pixel a pixel value associated with the background color(s)), identified in the first information, from the first information if the same pixel is also identified in the second information. In other words, if the first information identifies a pixel associated with the foreground color(s) (e.g., black) at a particular location of the image, and if the second information identifies a pixel associated with the foreground color(s) at the same location of the image, then the image processing platform may remove the pixel from the first information to generate the third information. In some implementations, the third information generated by the image processing platform may include a matrix of image data representative of the portions of the first lines (e.g., of only the portions of the first lines). Additionally, or alternatively, the third information generated by the image processing platform may include a new image that includes the portions of the first lines (e.g., includes only the portions of the first lines).

Figure 1E:
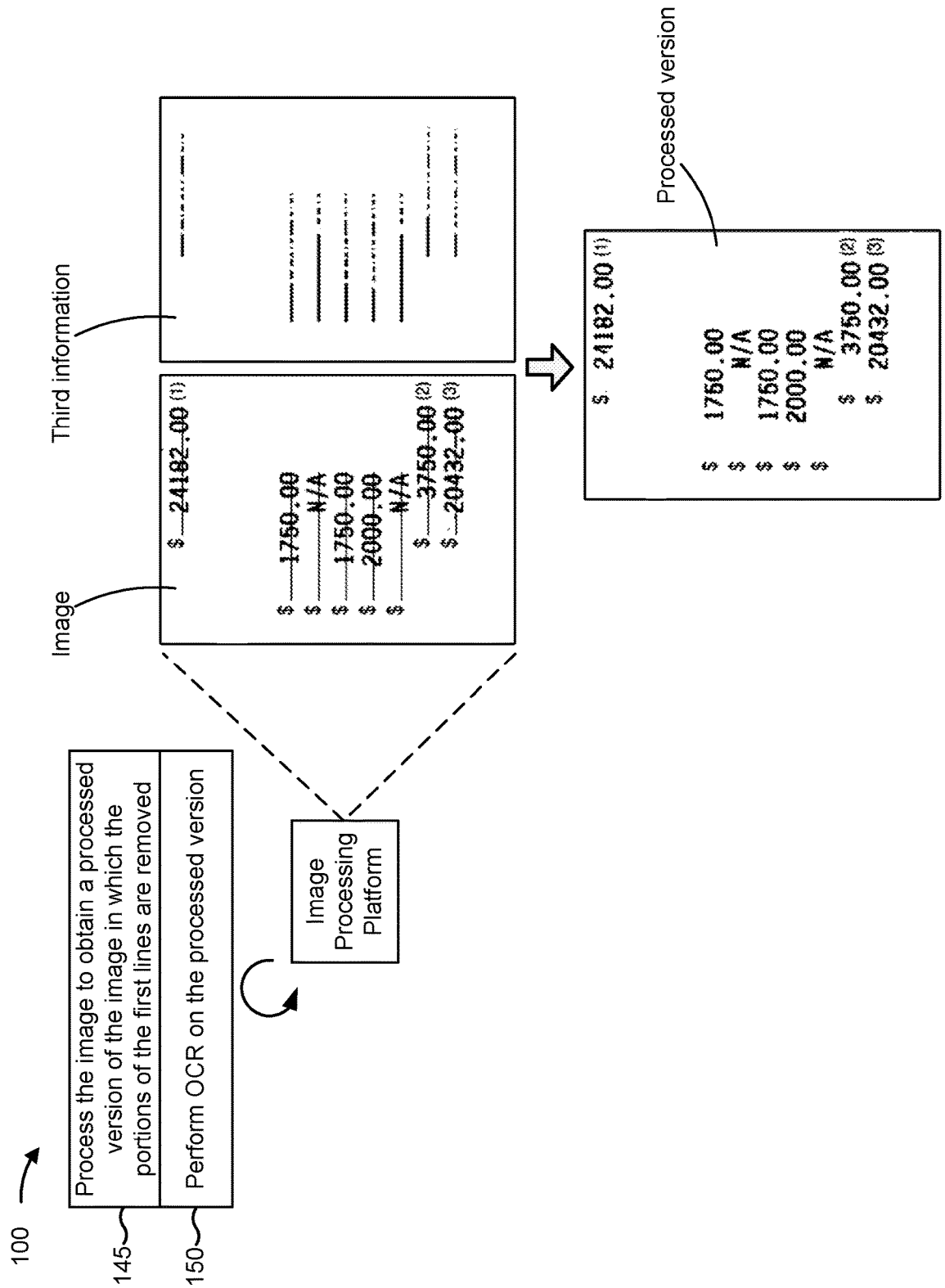

As shown in FIG. 1E, and by reference number 145, the image processing platform may process the image to obtain a processed version of the image (e.g., an image or image data corresponding to the image) in which the portions of the first lines are removed. The image processing platform may process the image based on the third information to obtain the processed version of the image. For example, the image processing platform may determine (e.g., compute) a difference of the image (e.g., image data of the image) and the third information (e.g., subtract the third information from the image data). As an example, the image processing platform may obtain the processed version of the image by removing a pixel (e.g., assigning to the pixel a pixel value associated with the background color(s)) identified in the third information from the image (e.g., image data of the image). In other words, if the third information identifies a pixel associated with the foreground color(s) (e.g., black) at a particular location of the image, then the image processing platform may remove the pixel from the image to obtain the processed version of the image. The processed version of the image may include a new image or a matrix of image data.

As shown by reference number 150, the image processing platform may perform OCR (e.g., using one or more OCR techniques) on the processed version of the image (e.g., in which the portions of the first lines are removed). The image processing platform may perform OCR to identify text in the processed version of the image, to extract text from the processed version of the image, or the like. For example, based on performing OCR, the image processing platform may generate a new version of the image, or a document based on the image, that includes machine-encoded text. The image processing platform may store the new image or document to a document repository, provide the new image or document to another device, or the like. As another example, based on performing OCR, the image processing platform may extract text from the image. The image processing platform may store, or cause another device to store, the extracted text (e.g., in a database), process, or cause another device to process, the extracted text, or the like.

As described above, OCR performed on the processed version of the image may have improved accuracy (e.g., relative to OCR performed on the original image and/or relative to OCR performed on an image processed using an inferior line removal technique). Accordingly, computing resources, that may otherwise be used for additional OCR processing of an image or manual review of the image when OCR is less accurate, may be conserved.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
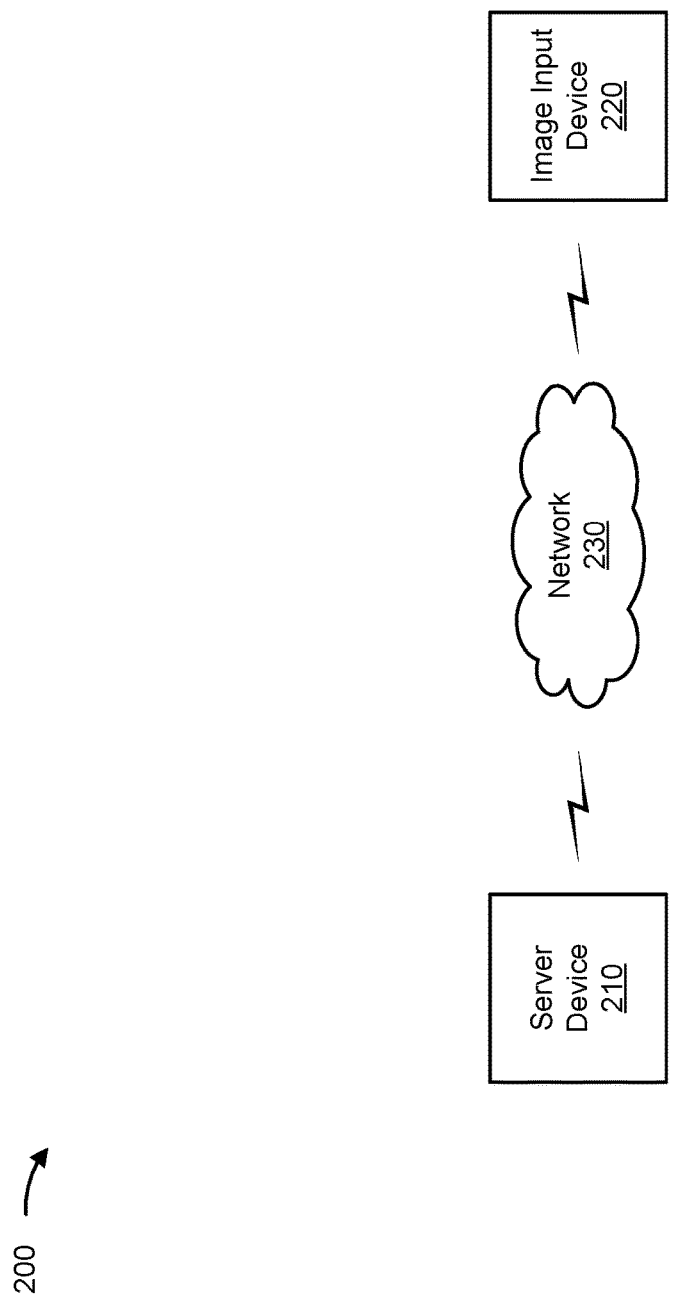
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a server device 210, an image input device 220, and a network 230. Devices of environment 200 may interconnect via wired connections, wireless connections, or a combination of wired and wireless connections.

The server device 210 includes one or more devices capable of receiving, generating, storing, processing, providing, and/or routing information associated with line removal from an image, as described elsewhere herein. The server device 210 may include a communication device and/or a computing device. For example, the server device 210 may include a server, such as an application server, a client server, a web server, a database server, a host server, a proxy server, a virtual server (e.g., executing on computing hardware), or a server in a cloud computing system. In some implementations, the server device 210 includes computing hardware used in a cloud computing environment. The server device 210 may implement the image processing platform, described elsewhere herein.

Image input device 220 includes one or more devices capable of receiving a digital image, transmitting a digital image, converting a document to a digital image, and/or storing a digital image for use by server device 210. For example, image input device 220 may include a scanner, a fax machine, a communication device and/or a computing device (e.g., a desktop computer, a laptop computer, a tablet computer, a handheld computer, a mobile computing device, and/or a smart phone, among other examples), a server (e.g., a host server, a document server, and/or a data center device, among other examples), or the like.

The network 230 includes one or more wired and/or wireless networks. For example, the network 230 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 230 enables communication among the devices of environment 200.

The quantity and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
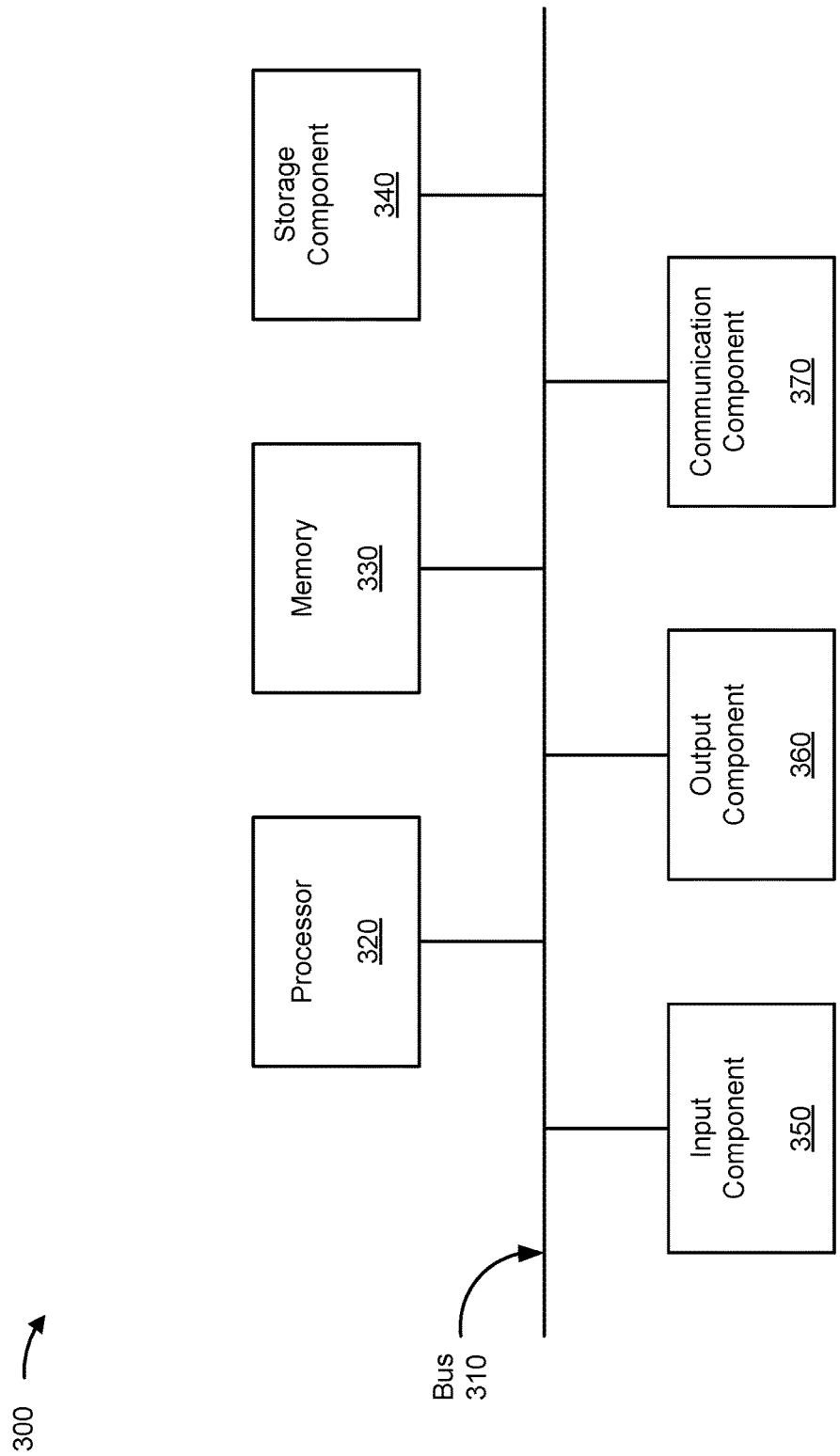
FIG. 3 is a diagram of example components of one or more devices of FIG. 2.

FIG. 3 is a diagram of example components of a device 300, which may correspond to server device 210 and/or image input device 220. In some implementations, server device 210 and/or image input device 220 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
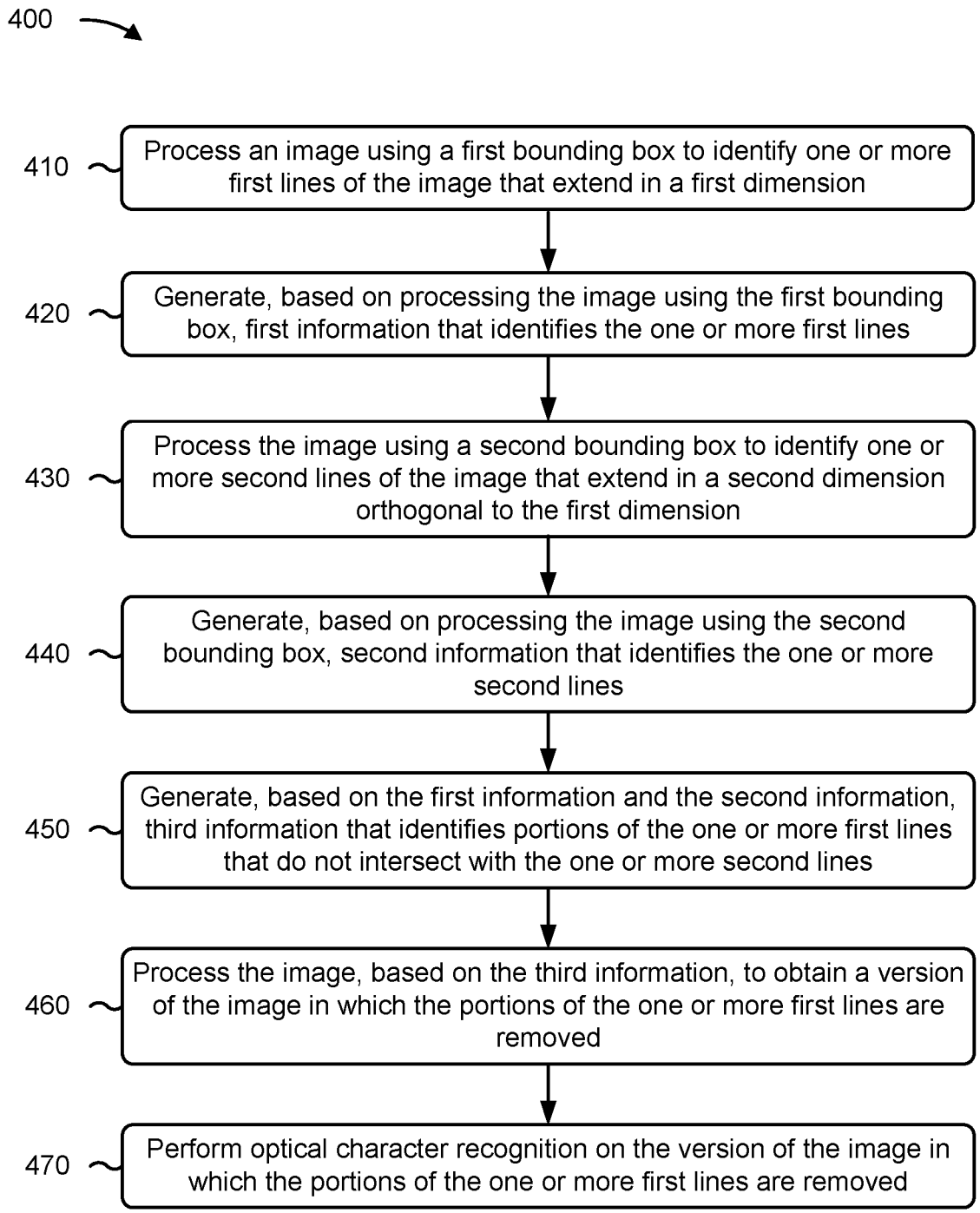
FIG. 4 is a flowchart of an example process relating to line removal from an image.

FIG. 4 is a flowchart of an example process 400 associated with line removal from an image. In some implementations, one or more process blocks of FIG. 4 may be performed by a device (e.g., server device 210). In some implementations, one or more process blocks of FIG. 4 may be performed by another device or a group of devices separate from or including the device, such as image input device 220. Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include processing the image using a first bounding box to identify one or more first lines of the image that extend in a first dimension (block 410). In some implementations, the first bounding box is elongated in the first dimension. As further shown in FIG. 4, process 400 may include generating, based on processing the image using the first bounding box, first information that identifies the one or more first lines (block 420). As further shown in FIG. 4, process 400 may include processing the image using a second bounding box to identify one or more second lines of the image that extend in a second dimension orthogonal to the first dimension (block 430). In some implementations, the second bounding box is elongated in the second dimension. As further shown in FIG. 4, process 400 may include generating, based on processing the image using the second bounding box, second information that identifies the one or more second lines (block 440). As further shown in FIG. 4, process 400 may include generating, based on the first information and the second information, third information that identifies portions of the one or more first lines that do not intersect with the one or more second lines (block 450). As further shown in FIG. 4, process 400 may include processing the image, based on the third information, to obtain a version of the image in which the portions of the one or more first lines are removed (block 460). As further shown in FIG. 4, process 400 may include performing optical character recognition on the version of the image in which the portions of the one or more first lines are removed (block 470).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for line removal from an image, the system comprising:
one or more memories; and
one or more processors, communicatively coupled to the one or more memories, configured to:
process the image using a first bounding box to identify one or more first lines of the image that extend in a first dimension,
wherein the first bounding box is elongated in the first dimension;
generate, based on processing the image using the first bounding box, first information that identifies the one or more first lines;
process the image using a second bounding box to identify one or more second lines of the image that extend in a second dimension orthogonal to the first dimension,
wherein the second bounding box is elongated in the second dimension, and wherein a size of the second bounding box in the second dimension is greater than a size of the first bounding box in the second dimension;
generate, based on processing the image using the second bounding box, second information that identifies the one or more second lines;
generate, based on the first information and the second information, third information that identifies portions of the one or more first lines that do not intersect with the one or more second lines;
process the image, based on the third information, to obtain a version of the image in which the portions of the one or more first lines are removed; and
perform optical character recognition on the version of the image in which the portions of the one or more first lines are removed.

2. The system of claim 1, wherein the image includes text, and
wherein the one or more first lines are horizontal lines relative to an orientation of the text, and the one or more second lines are vertical lines relative to the orientation of the text.

3. The system of claim 1, wherein a size of the first bounding box in the first dimension is greater than the size of the second bounding box in the second dimension.

4. The system of claim 1, wherein a first line, of the one or more first lines, is identified based on identifying a plurality of pixels of the image, consecutive in the first dimension, that are associated with one or more particular pixel values, and
wherein a second line, of the one or more second lines, is identified based on identifying a plurality of pixels of the image, consecutive in the second dimension, that are associated with the one or more particular pixel values.

5. The system of claim 1, wherein a first threshold quantity of pixels, consecutive in the first dimension, used for identifying a first line of the one or more first lines is greater than a second threshold quantity of pixels, consecutive in the second dimension, used for identifying a second line of the one or more second lines.

6. The system of claim 5, wherein the first threshold quantity of pixels is at least a quantity of pixels that corresponds to a width of at least two textual characters in the image, and
wherein the second threshold quantity of pixels is at most a quantity of pixels that corresponds to a height of one textual character in the image.

7. The system of claim 1, wherein the one or more processors, when processing the image using the first bounding box, are configured to scan the image along the first dimension in increments corresponding to the first bounding box, and
wherein the one or more processors, when processing the image using the second bounding box, are configured to scan the image along the second dimension in increments corresponding to the second bounding box.

8. A method for line removal from an image, comprising:
processing, by a device, the image using a first bounding box to identify one or more first lines of the image that extend in a first dimension, the first bounding box comprising a first quantity of pixels in the first dimension and a second quantity of pixels in a second dimension orthogonal to the first dimension;
processing, by the device, the image using a second bounding box to identify one or more second lines of the image that extend in the second dimension, the second bounding box comprising a quantity of pixels in the second dimension that is greater than the second quantity of pixels associated with the first bounding box;
identifying, by the device, portions of the one or more first lines that do not intersect with the one or more second lines; and
processing, by the device, the image to obtain a version of the image in which the portions of the one or more first lines are removed.

9. The method of claim 8, further comprising:
performing optical character recognition on the version of the image in which the portions of the one or more first lines are removed.

10. The method of claim 8, wherein the image includes text, and
wherein the one or more first lines are horizontal lines relative to an orientation of the text, and the one or more second lines are vertical lines relative to the orientation of the text.

11. The method of claim 8, wherein a first line, of the one or more first lines, is identified based on identifying a plurality of pixels of the image, consecutive in the first dimension, that are associated with one or more particular pixel values, and
wherein a second line, of the one or more second lines, is identified based on identifying a plurality of pixels of the image, consecutive in the second dimension, that are associated with the one or more particular pixel values.

12. The method of claim 8, wherein a first threshold quantity of pixels, consecutive in the first dimension, used for identifying a first line of the one or more first lines is greater than a second threshold quantity of pixels, consecutive in the second dimension, used for identifying a second line of the one or more second lines.

13. The method of claim 12, further comprising:
identifying a size of textual characters in the image; and
determining the first threshold quantity of pixels and the second threshold quantity of pixels based on the size of the textual characters.

14. A non-transitory computer-readable medium storing a set of instructions for line removal from an image, the set of instructions comprising:
    one or more instructions that, when executed by one or more processors of a device, cause the device to:
        process the image using a first kernel to identify one or more first lines of the image;
        generate, based on processing the image using the first kernel, first information that identifies the one or more first lines;
        process the image using a second kernel to identify one or more second lines of the image orthogonal to the one or more first lines;
        generate, based on processing the image using the second kernel, second information that identifies the one or more second lines, wherein a quantity of rows of the second kernel is greater than a quantity of rows of the first kernel;
        generate, based on the first information and the second information, third information that identifies portions of the one or more first lines that do not intersect with the one or more second lines; and
        process the image, based on the third information, to obtain a version of the image in which the portions of the one or more first lines are removed.

15. The non-transitory computer-readable medium of claim 14, wherein the image includes text, and
    wherein the one or more first lines are horizontal lines relative to an orientation of the text, and the one or more second lines are vertical lines relative to the orientation of the text.

16. The non-transitory computer-readable medium of claim 14, wherein the first kernel includes a greater quantity of columns than rows, and the second kernel includes a greater quantity of rows than columns.

17. The non-transitory computer-readable medium of claim 14, wherein a first line, of the one or more first lines, is identified based on identifying a plurality of pixels of the image, consecutive in a first dimension, that are associated with one or more particular pixel values, and
    wherein a second line, of the one or more second lines, is identified based on identifying a plurality of pixels of the image, consecutive in a second dimension orthogonal to the first dimension, that are associated with the one or more particular pixel values.

18. The non-transitory computer-readable medium of claim 14, wherein a portion of a first line, of the one or more first lines, overlaps with text in the image, and
    wherein a second line, of the one or more second lines, is a portion of the text.

19. The non-transitory computer-readable medium of claim 14, wherein the first information, the second information, and the third information are respective matrices of image data.

20. The non-transitory computer-readable medium of claim 14, wherein the one or more instructions, that cause the device to process the image using the first kernel, cause the device to scan the image along a first dimension in increments corresponding to the first kernel, and
    wherein the one or more instructions, that cause the device to process the image using the second kernel, cause the device to scan the image along a second dimension, orthogonal to the first dimension, in increments corresponding to the second kernel.

\* \* \* \* \*